P. A. FISKER.
MOTORCYCLE.
APPLICATION FILED MAY 4, 1918.
1,324,242.
Patented Dec. 9, 1919.
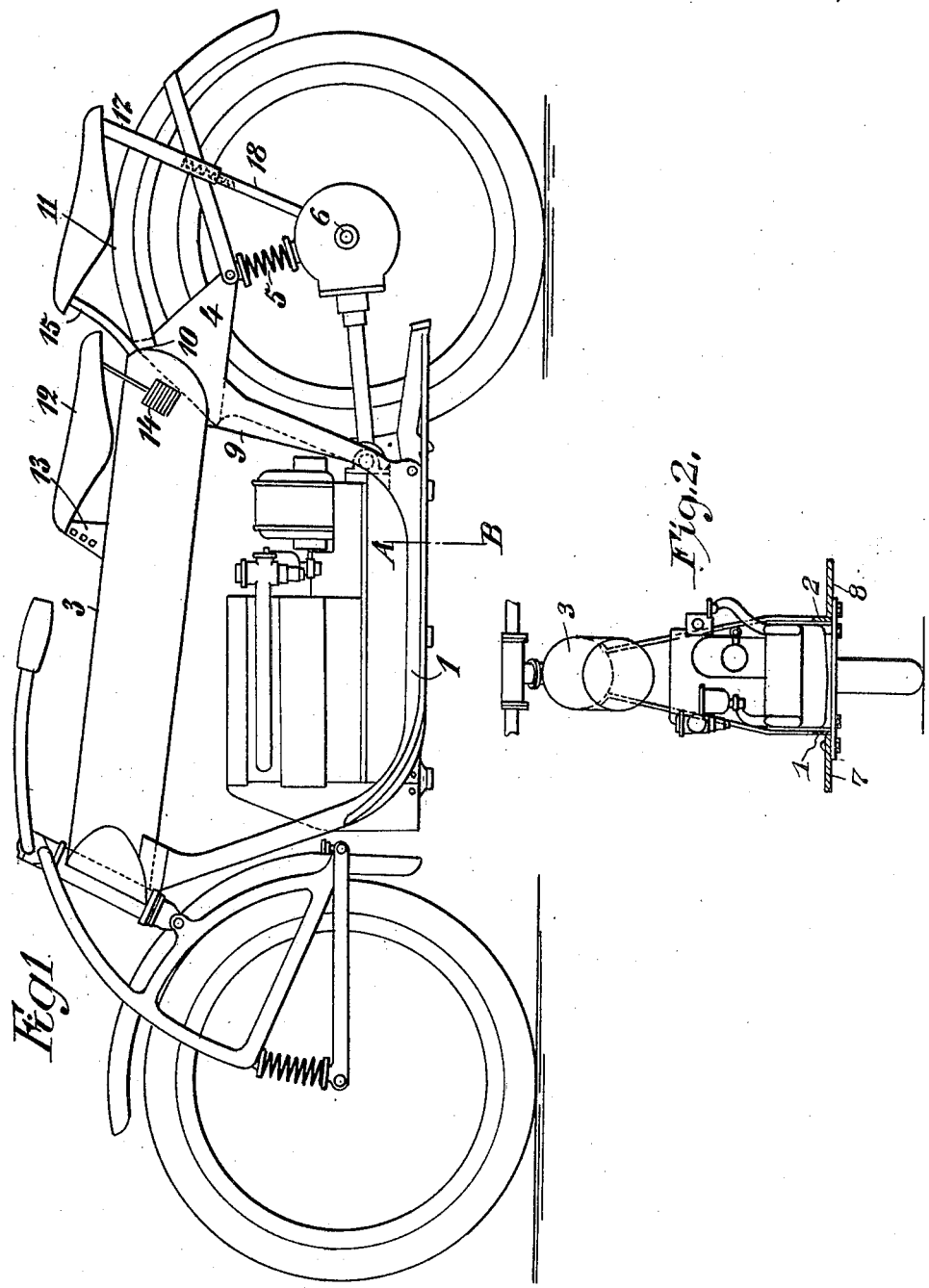
Inventor:
Peder Andersen Fisker
By Emil Piourelycke
Attorney.

UNITED STATES PATENT OFFICE.

PEDER ANDERSEN FISKER, OF COPENHAGEN, DENMARK.

MOTORCYCLE.

1,324,242.　　　　Specification of Letters Patent.　　Patented Dec. 9, 1919.

Application filed May 4, 1918. Serial No. 232,670.

*To all whom it may concern:*

Be it known that PEDER ANDERSEN FISKER, machine-manufacturer, a subject of the Kingdom of Denmark, residing at No. 30 Peder Bangsvej, in the city of Copenhagen and Kingdom of Denmark, has invented certain new and useful Improvements in Motorcycles; and he does hereby declare the following to be a full, clear, and exact description of the invention, such as will enable others skilled in the art to which it appertains to make and use the same.

This invention relates to a motorcycle and is chiefly characterized by the fact that the members of the frame forming the lower connection between the front sleeve and the saddle are continuous and consist, *e. g.*, of flat steel bars lying with their broad sides mainly vertical and one on each side of the motor and the benzin container which latter serves as the top bar of the frame and carries the saddle. Furthermore the invention is characterized by the fact that at both sides of these parts of the frame bars which are mainly horizontal, suitable foot plates are arranged forming together with the bottoms of the motor and the gear casing a broad dust guard. According to the invention finally those parts of the frame bars lying close to the rear wheel of the cycle are connected by means of a suitable plate forming together with the frame bars a part of the rear guard of the cycle.

A constructional form of a cycle according to the invention is represented on the drawing. Figure 1 is a side view of the cycle, and Fig. 2 shows schematically the arrangement of the motor between the benzin container and the frame bars the latter being sectioned, *e. g.*, along the line A—B of Fig. 1. Fig. 2 also shows the foot plates.

1 and 2 are the continuous tubes or bars extending from the front sleeve to the saddle and forming the lower part of the frame. In Fig. 1 only the left bar 1 is visible, the other being covered by it. The benzin container 3 forms the top bar of the frame and its rear wall is formed by a curved plate so that two flaps 4, of which only the left is represented in Fig. 1, extend to both sides of the rear wheel and support a pair of springs 5, only the left hand spring appearing in Fig. 1. The springs 5 support the rear end of the frame, their lower ends resting upon parts connected with the hub 6 of the rear wheel. The continuous frame parts 1 and 2 preferably consist of flat steel bars lying with their broad sides vertically, and as shown in Fig. 2 they are arranged one on each side of the motor, &c., so that on a level with the bottom surfaces of the motor and the gear casing two foot plates 7, 8 may be arranged forming together with the said bottom surfaces a broad dust guard. The front ends of the foot plates are bent somewhat upward in the construction shown in the drawing so that they conform essentially to the shape of the fore part of the frame.

Between the parts of the frame bars 1 and 2 close to the rear wheel a suitable plate 9 is arranged forming part of the above mentioned guard. Centrally of the rear wall of the benzin container a flange 10 is provided to which the rear part of the guard 11 may be fixed.

The front or main saddle 12 is carried directly by the benzin container 3. Its fore end may be adjustably connected to an upright 13 on the top of the container in order to vary its inclination while its rear end is carried adjustably by springs 14 on both sides of the benzin container. To said container there is furthermore fixed a rearwardly extending arm 15 which supports the fore end of the rear saddle, while the rear end of the latter is supported by parts connected with the hub 6 of the rear wheel by means of spring connected tubes 17, 18.

Claims.

1. In a motor cycle, a frame consisting of a fuel tank forming the upper member thereof, and a pair of continuous flat bars, one at each side of the tank, each bar comprising substantially vertical front and rear portions having their free upper ends connected with the front and rear ends of said tank and a substantially horizontal portion connecting the lower ends of said front and rear portions and integral therewith; substantially as described.

2. In a motor cycle, a frame consisting of a fuel tank forming the upper member thereof and provided with rearwardly extending lugs at its rear end, and a pair of continuous flat bars, one at each side of the tank, each bar comprising substantially vertical front and rear portions having their free upper ends connected with the front end of the tank and with said lugs and a substantially horizontal portion connecting the lower ends of said front and rear portions and integral therewith; in combination with resilient supporting means connecting said lugs and the hub of the rear wheel; substantially as described.

3. In a motor cycle, a frame consisting of a fuel tank forming the upper member thereof, and a pair of continuous flat bars, one at each side of the tank, each bar comprising substantially vertical front and rear portions having their free upper ends connected with the front and rear ends of said tank and a substantially horizontal portion connecting the lower ends of said front and rear portions and integral therewith; in combination with a motor disposed between and supported by said bars and having its bottom surface substantially in line with the horizontal portions of the bars, and foot plates secured to said horizontal portions and coöperating with the bottom surface of the motor to form a wide, continuous dust guard; substantially as described.

4. In a motor cycle, a frame consisting of a fuel tank forming the upper member thereof, and a pair of continuous flat bars, one at each side of the tank, each bar comprising substantially vertical front and rear portions having their free upper ends connected with the front and rear ends of said tank and a substantially horizontal portion connecting the lower ends of said front and rear portions and integral therewith; in combination with an upright mounted upon the top wall of said tank, a saddle having its front end adjustably connected to said upright to vary its inclination, and resilient supporting means for the rear end of the saddle disposed at opposite sides of and connected to said tank; substantially as described.

5. In a motor cycle, a frame consisting of a fuel tank forming the upper member thereof, and a pair of continuous flat bars, one at each side of the tank, each bar comprising substantially vertical front and rear portions having their free upper ends connected with the front and rear ends of said tank and a substantially horizontal portion connecting the lower ends of said front and rear portions and integral therewith; in combination with an upright mounted upon the top wall of said tank, a saddle having its front end adjustably connected to said upright to vary its inclination, resilient supporting means for the rear end of the saddle disposed at opposite sides of and connected to said tank, a saddle disposed in rear of the first saddle, a rearwardly-extending support for the front end of the rear saddle secured to said tank, and spring-controlled members for supporting the rear end of said rear saddle secured to the hub of the rear wheel; substantially as described.

In testimony whereof, he affixes his signature.

PEDER ANDERSEN FISKER.